Sept. 8, 1959 H. P. ELLIOTT 2,903,510

WORK HOLDERS AND AUXILIARY SUPPORT FOR WORK HOLDERS OF FACSIMILE PRODUCING MACHINES

Filed July 22, 1957 3 Sheets-Sheet 1

INVENTOR.
Harmon P. Elliott
BY his Atty.
John H. McKenna

INVENTOR.
Harmon P. Elliott
BY his Atty.,
John H. McKenna

INVENTOR.
Harmon P. Elliott
BY his Atty.,
John H. McKenna

United States Patent Office 2,903,510

Patented Sept. 8, 1959

2,903,510

WORK HOLDERS AND AUXILIARY SUPPORT FOR WORK HOLDERS OF FACSIMILE PRODUCING MACHINES

Harmon P. Elliott, Watertown, Mass., assignor to Elliott Addressing Machine Company, Cambridge, Mass., a corporation of Massachusetts Application July 22, 1957, Serial No. 673,367

7 Claims. (Cl. 178—6.6)

This invention relates to improvements in facsimile producing apparatus and more especially to an improved work holder for such apparatus and an auxiliary work holder for supporting one work holder for unloading and reloading thereof while another loaded work holder is removably mounted in the facsimile producing apparatus. The invention is particularly concerned with facsimile reproduction of any printing, writing, design or picture which may be on the individuals of a series of original work pieces, such as bank signature cards, for example, by means of a well known optical-electronic burning or cutting process employed in well known varieties of commercially available facsimile producing machines. In such machines, the original or master work piece and a prospective facsimile work piece are mounted in side by side relation on a rotating work support. As an electronic eye scans the rotating master work piece, an electrically-responsive needle or stylus, in operative relation to the prospective facsimile work piece, reproduces exactly on the latter work piece whatever matter appears on the master work piece.

It is among the objects of the invention to provide a work holder for conventional facsimile producing machines having provision for supporting a series of master work pieces in succession around the axis of the holder and a similar series of prospective facsimile printing devices, such as stencils, in succession around said axis with each of the latter said printing devices beside and opposite a said master work piece, said work holder having manually operable work-retaining means facilitating loading and unloading of the work holder.

Another object of the invention is to provide an improved work holder for conventional facsimile producing machines whereby the work holder is readily and quickly removable from and insertible in conventional facsimile producing machines to permit removal of one work holder for unloading and reloading thereof while facsimile printing devices are being produced on a second loaded work holder substituted for the said removed work holder.

A further object of the invention is to provide an auxiliary work holder supporting device for rotatably supporting a work holder during unloading and reloading thereof and having means ensuring proper positioning and retaining of prospective facsimile printing devices with respect to master work pieces on the work holder.

It is, moreover, my purpose and object generally to improve the efficiency of machines for producing facsimile printing devices by means of improved work holders and an auxiliary work holder unloading and loading support, whereby one work holder may be unloaded and reloaded while facsimile printing devices are being produced on another loaded work holder removably mounted in the facsimile producing machine.

Figure 1:
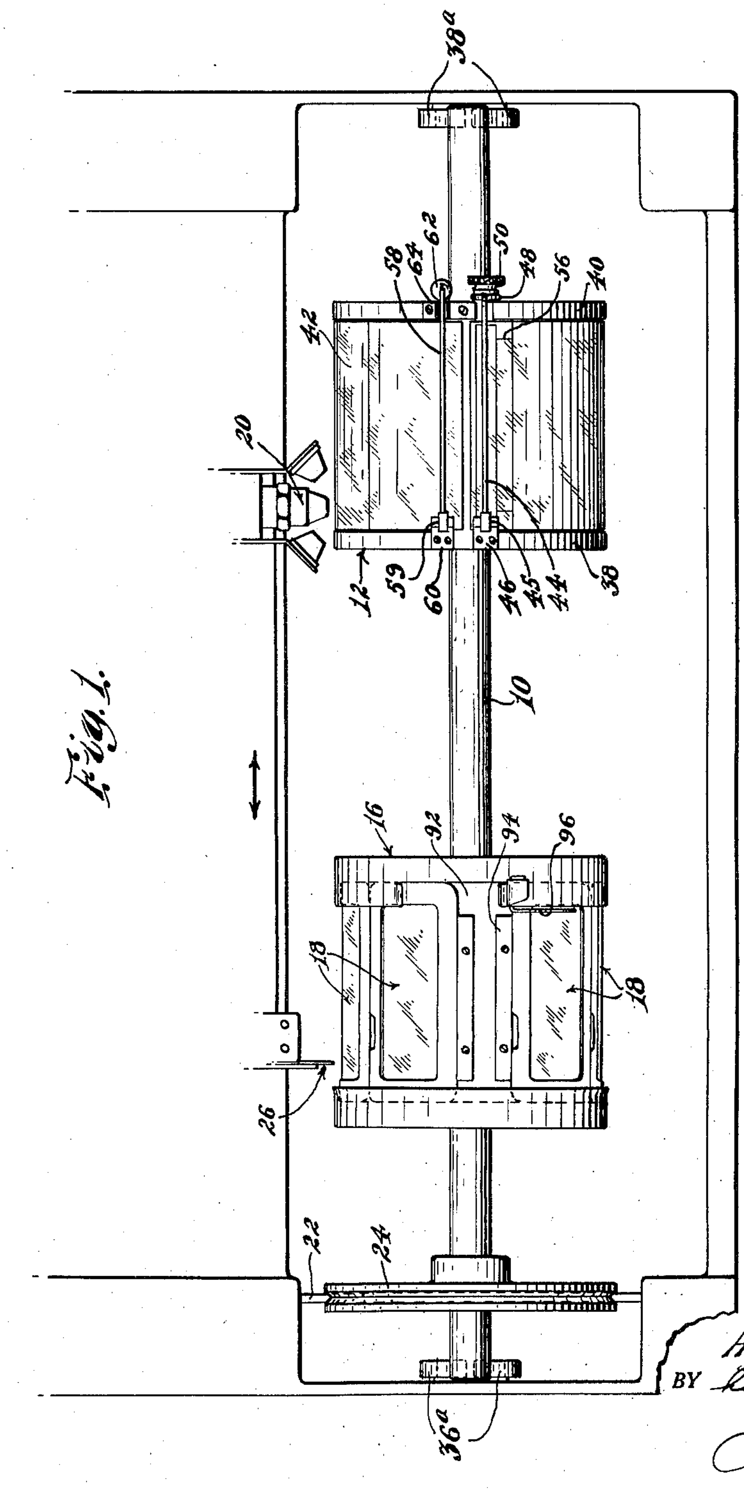
Fig. 1 is a top plan view of a facsimile producing machine having work holding means therein embodying features of the invention.
Figure 2:
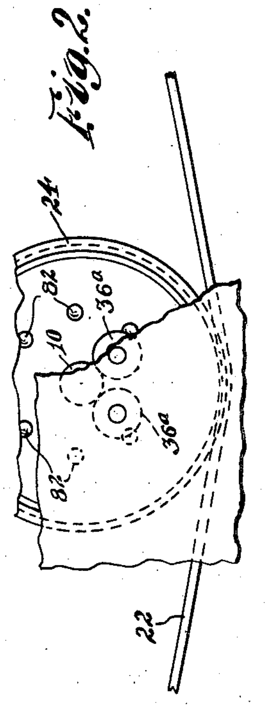
Fig. 2 is a fragmentary view of the left-hand end of the machine of Fig. 1.

Referring to the drawings, portions of a conventional variety of electronic facsimile producing machines are represented in Fig. 1, having a work holder therein which embodies features of the present invention. The work holder comprises a shaft 10 on which are secured, in spaced relation, a drum 12 for holding a predetermined number of master work pieces, herein shown as bank signature cards 14, and a drum 16 for holding a like number of prospective facsimile printing devices or stencils 18. The cards and stencils are arranged on the respective drums edge to edge around the axis of shaft 10, and an electronic eye device, indicated generally at 20, is mounted on a carriage in position to scan the master cards 14 as the carriage feeds along the rotating work holder. Rotation of the work holder is accomplished by the driven belt 22 with which pulley 24, on holder shaft 10, engages when the work holder is inserted in the facsimile producing machine. A needle or stylus is indicated at 26 mounted on the said carriage opposite the drum 16. The electronic eye device 20 and the needle 26 move in unison respectively along the cards 14 and the stencils 18, and needle 26 responds to the scanning device 20, reproducing exactly on the prospective facsimile stencils 18 whatever matter may have been suitably applied to the master cards 14, such as the name, signature, and the account number of a bank depositor. This electronic facsimile producing procedure is well known and constitutes no part of the present invention. However, the particular work holder, and the illustrated means for rotatably supporting it in the conventional facsimile producing machine so that the work holders may be readily and quickly substituted, one for another, in the facsimile producing machine, embody essential features of my present invention, in conjunction with an auxiliary work holder support in which one work holder may be unloaded and reloaded while facsimile stencils are being produced on another work holder mounted in the facsimile producing machine.

Referring to Figs. 3–8, a suitable auxiliary work holder support may have a base 30 on the opposite end portions of which are secured the upright supporting members 32, 34. A pair of rollers 36, 36 are rotatably mounted on the inner side of upright member 32 in relative positions for supporting one end of shaft 10 of one of my improved work supports, as shown by dotted lines in Fig. 4. A similar pair of rollers 38, 38 are rotatably mounted on the inner side of upright member 34 for similarly supporting the opposite end of a said shaft 10. Upper portions of the upright members 32, 34 may be formed with the spaced ears 33 and 35, respectively, to facilitate insertion of the ends of shaft 10 into seated relation on the rollers 36, 36 and 38, 38. The shaft 10 has nice fit between the upper vertical portions 32′ and 34′ of the respective upright members with the said portions 32′, 34′ preventing axial movement of the mounted shaft.

The work holder shown in Figs. 3–8, mounted in the auxiliary work holder support, is identical with the work holder which is shown mounted in the facsimile producing machine in Fig. 1, the said machine being equipped with bearing rollers 36ª and 38ª for rotatably supporting the opposite ends of a work holder shaft 10 in the facsimile producing machine generally the same as the rollers 36, 36 and 38, 38 support a work holder in the auxiliary work holder support. The drum 12 has a relatively narrow curved strip 38 secured to the peripheral surface of the drum adjacent to one end thereof and extending almost completely around the drum. Another similar curved strip 40 is secured to the peripheral surface of the drum adjacent to the opposite end thereof and it too extends almost entirely around the drum, the space between said strips nicely accommodating master cards 14, or the like, with the adjacent edges of the strips 38, 40 constituting abutment shoulders which prevent any appreciable axial movement of a card arranged lengthwise between the strips and pressed against the curved periphery of the drum. The master cards 14 are held on the drum and pressed against the periphery thereof by a sheet 42 of transparent flexible material one end of which is secured to the drum by a clamping bar or rod 44 which may be hinged at 45 to a drum bracket 46 and provided at its opposite end with an off-set loop 48 for reception of a thumb screw 50, or the like, which may be screwed into an ear 52 on the drum. A resilient cushioning strip 54 may extend between the drum surface and the clamped end of sheet 42 so that, as bar or rod 44 is brought into engagement with sheet 42 and is secured by screw 50, this end of sheet 42 becomes securely clamped to the drum.

An abutment strip 56 is secured to the drum surface close to the location of clamping bar 44.

The transparent sheet 42 has length for extending from clamping bar 44 substantially all around the drum 12, it being drawn relatively tightly in wrapped condition over the master cards 14 on the drum when the drum is loaded with stencils. It may be secured in its wrapped condition by the clamping rod 58 which is hinged at 59 on the drum bracket 60. The opposite end of rod 58 may be equipped with a finger knob 62 for manual movement of rod 58 into and out of clamping engagement with the wrapped marginal end portion of sheet 42, there being a spring clip means 64 on the drum for yieldingly maintaining rod 58 in sheet-clamping condition.

Relatively tight wrapping of transparent sheet 42 over the cards 14 on drum 12 is facilitated by a roller 66 on the inverted U-frame 68 which is pivoted at 70 at the upper ends of uprights 72. An over-center spring 74 acts between the frame 68 and one of the uprights 72 for biasing the frame against stop 76 when the spring is carried to one side of pivot 70, and for biasing the frame toward the drum 12 when the spring is carried to the other side of pivot 70. The frame 68 is adapted to be moved manually about its pivot at 70 by means of its handle 78 and, when moved toward drum 12 to carry spring 74 to the drum side of pivot 70, the spring biases roller 66 into engagement with the transparent sheet 42 on the drum.

Figures 3, 4, 5:
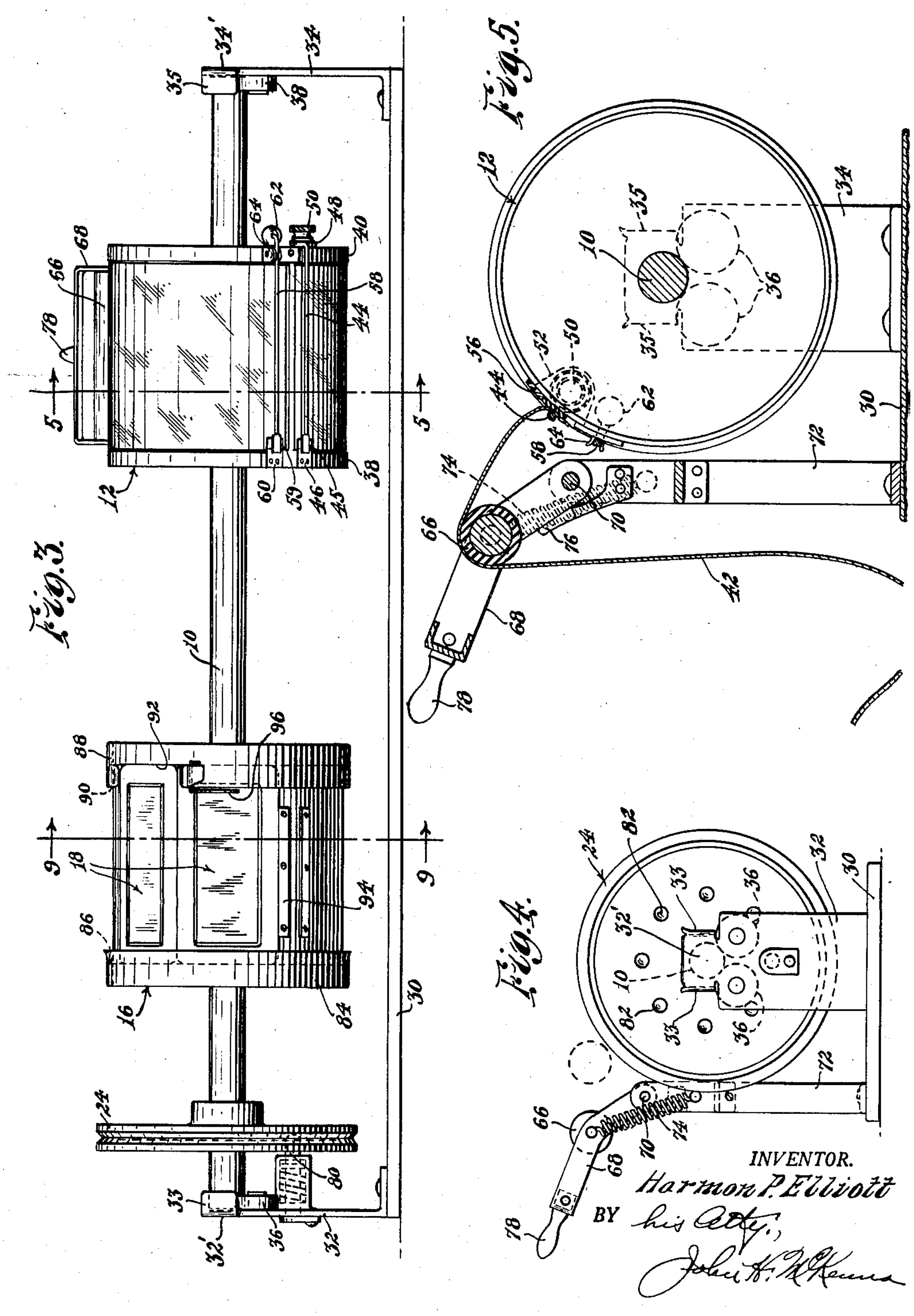
Fig. 3 is a side elevation of a work holder similar to the work holder in Fig. 1 but mounted in an auxiliary loading and unloading support which is separate from the machine of Fig. 1, and with its master-card drum completely loaded and its facsimile drum in the process of being loaded.
Fig. 4 is an end view of the work holder auxiliary support and the mounted work holder of Fig. 3.
Fig. 5 is a cross-sectional view on line 5—5 of Fig. 3 showing, on a larger scale, the master-card drum ready to be loaded.

When drum 12 is to be loaded with master cards 14, its transparent sheet 42 will be released from clamping rod 58 and the drum rotated to bring the abutment edge of strip 56 on the drum surface to its position of Fig. 5. Meanwhile the loose sheet 42 preferably will be draped over the roller 66 as shown in Fig. 5, while the roller is in its position away from drum 12. The initial master card 14 is inserted on the drum between the end abutments 38, 40 with its leading side edge thrust against abutment strip 56. Roller 66 then may be drawn forward to press the roller-engaged portion of transparent sheet 42 into retaining engagement with the inserted card. Each succeeding master card is inserted between the end abutments 38, 40 and thrust into edge engagement with the preceding card until the drum surface is filled with cards 14, the drum being intermittently rotated as the loading progresses with roller 66 laying sheet 42 over upon the cards in succession and holding the latter pressed against the curved surface of the drum. When the final card is in place, the free end margin of sheet 42 will be in position to be clamped by clamping rod 58, after which the roller 66 may be moved back away from the drum.

During the loading, the drum 12 preferably is yieldingly maintained in each position of rotational advance by means of a suitable spring-biased pin 80 on upright member 32, which engages in succession in detents 82 which are arranged in a circle in pulley 24.

Drum 16, at one end margin thereof, has fixed thereon an annular means 84 which, with the adjacent surface of the drum provides an annular groove 86 open toward the opposite end of the drum. The said opposite end of the drum has generally similar means 88 rotatably mounted on the drum and providing, with the adjacent drum surface, an annular groove 90 open toward the groove 86. The means 88 is cut away at 92 to permit a stencil 18 to be inserted on the drum. One end of the stencil may be inserted in groove 86 and its other end may be pressed against the drum at the cut-out 92, followed by relative rotation of means 88 on the drum to bring a non-cut-away portion of means 88, into retaining relation to the stencil 18. An abutment bar 94 is fixed on the surface of drum 16 in a predetermined relationship to the abutment strip 56 on drum 12, and the initially inserted stencil 18 is pressed edgewise against bar 94 to locate it precisely opposite a master card 14 on drum 12. Each succeeding stencil inserted on drum 16 is engaged edgewise with the preceding stencil, and the means 88 is intermittently rotated relative to drum 16 following insertion of each stencil, until a predetermined number of stencils are in position on drum 16, each precisely opposite a master card 14 on drum 12.

Figures 6, 7, 8, 9, 10, 11:
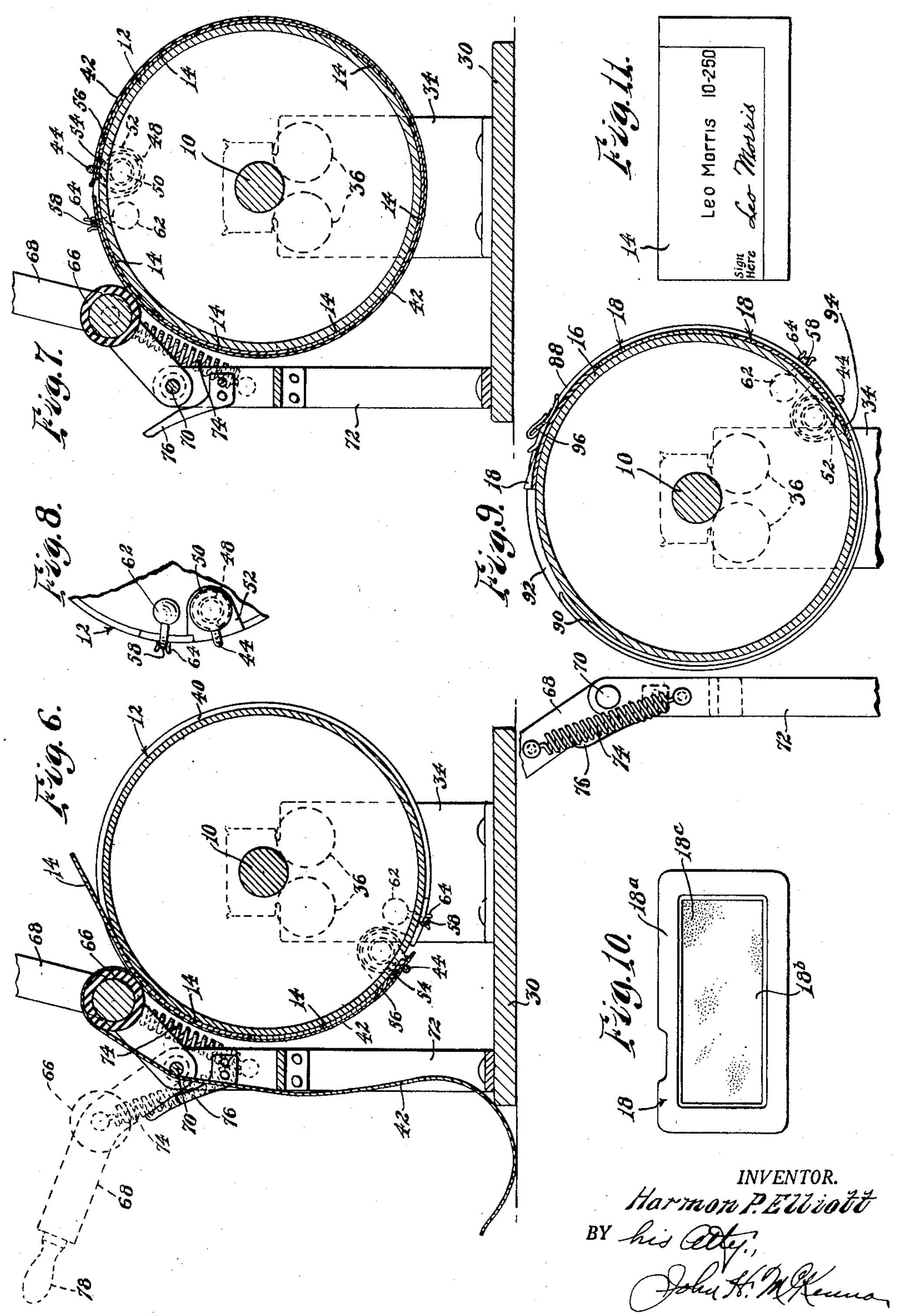
Fig. 6 is a view generally similar to Fig. 5 but showing the drum in partially loaded condition.
Fig. 7 is a view generally similar to Figs. 5 and 6 but showing the completely loaded drum.
Fig. 8 is a fragmentary end elevation of a portion of the drum of Figs. 5–7.
Fig. 9 is a cross-sectional view on line 9—9 of Fig. 3 showing the facsimile-stencil drum at a mid-stage of its loading process.
Fig. 10 is a face view of a stencil suitable for use on the facsimile drum of the work holder.
Fig. 11 is a face view of one of the master cards suitable for use on the master-card drum of the work holder.

Each stencil 18 has a generally rectangular frame 18ª within which a transfer tissue portion 18ᵇ is mounted, as shown in Fig. 10. The tissue portion 18ᵇ may be a tissue-thin sheet of carbon paper, or the like having a carbon under surface and having a thin coating or film 18ᶜ of vinyl plastic, or the like, on its upper or outer surface, as is well known in the electronic facsimile producing art. As herein represented, a spring element 96 is mounted on the rotatable means 88 of drum 16, adjacent to the cut-out at 92, and the spring element is in position to resiliently engage one end portion of the tissue portion 18ᵇ of each inserted stencil when the means 88 is rotated to retain the stencil. The spring element presses the engaged tissue against the drum and holds the final stencil against accidental displacement.

The master cards 14 are herein shown as bank signature cards, each of which will have thereon the signature of a depositor and the typed in name and account number of the depositor, as shown in Fig. 11. The signature, name and account number for each customer may be exactly reproduced on stencils 18 by means of the facsimile producing machine of Fig. 1, so that the customer's authentic signature may be reproduced from a stencil on the customer's ledger sheet. Hence, at the time of posting a check, the bookkeeper can compare the signature on the check with the customer's authentic signature as reproduced on the ledger sheet, which makes it feasible to verify or reject the check at the time of posting.

The invention contemplates having two or more of the work holders available, so that facsimile stencils may be produced on one work holder in the machine of Fig. 1 while another work holder is being loaded with master cards 14 and stencils 18 in the auxiliary support of Figs. 3–9. As soon as facsimile stencils have been completed on the work holder in the machine of Fig. 1, this work support may be removed from the machine and a freshly loaded work holder from the auxiliary support may be inserted in the machine. The removed work holder then may be mounted in the auxiliary support for unloading and reloading.

It is intended that the patent shall cover, by suitable expression in the appended claims, whatever features of patentable novelty exist in the invention disclosed.

I claim as my invention:

1. Apparatus for mounting master elements and facsimile elements in predetermined relationship, comprising a shaft having first and second axially spaced drums fixed thereon for rotation therewith, a holder having vertical wall portions spaced for reception of said shaft therebetween with the shaft restrained by said wall portions against any appreciable axial movement, a pair of rollers mounted on said holder adjacent to each of said vertical wall portions for rotatably supporting opposite end portions of said shaft when the shaft is positioned between said vertical wall portions, said shaft when in said holder, resting by gravity on said rollers and being free to be lifted out of the holder, said first drum having means thereon for maintaining a plurality of generally rectangular master elements in edge to edge relation around the surface of said first drum with the face of each master element exposed, and said second drum having means thereon for maintaining an equal number of generally rectangular facsimile elements in edge to edge relation around the surface of said second drum with each facsimile element approximately aligned with a said master element on said first drum.

2. Apparatus for mounting master elements and facsimile elements in predetermined relationship as defined in claim 1, wherein said holder is on a facsimile producing machine which has a scanning means, a facsimile producing means and a driven belt therein, and said shaft has a pulley fixed thereon in position to frictionally engage said driven belt when the shaft is inserted in said holder into supported relation to said rollers, whereby said drums rotate in unison to move said master elements in succession past said scanning means and to move said facsimile elements in succession past said facsimile producing means.

3. Apparatus for mounting master elements and facsimile elements in predetermined relationship as defined in claim 1, wherein said holder rotatably supports said shaft when said drums are being loaded and unloaded and has means associated with said vertical wall portions for maintaining opposite end portions of the shaft against lateral movement, said shaft having a pulley fixed thereon, and said pulley having a concentric annular series of detents in a face thereof, and yieldable means on said holder for engaging in said detents in succession in response to manual rotations of said drums, thereby to yieldingly maintain the drums at rest during mounting of each master element and each facsimile element on the respective drums.

4. Supporting apparatus for master-card elements and facsimile stencil elements, comprising a base member having spaced standards at opposite end portions thereof, a shaft removably and rotatably supported at upper portions of said standards, a first drum fixed on said shaft and having an abutment member secured on its surface in general parallelism with the axis of said shaft, said abutment providing a shoulder against which an edge of a flexible master card element may be thrust, a flexible sheet of transparent material secured at one of its ends to said drum adjacent to said abutment, means operative for laying said flexible sheet over upon said master card element to press said card element against the curved surface of the drum whereby said card element provides an abutment edge against which an edge of a second master card element may be thrust preparatory to laying of said flexible sheet over upon said second card element to provide an abutment edge against which an edge of a third master card element may be thrust preparatory to laying of said flexible sheet over upon said third card element, means for removably securing said flexible sheet in laid-over relation to all master card elements arranged in edge-to-edge succession around the surface of said first drum, a second drum fixed on said shaft in axially spaced relation to said first drum, means on said second drum for removably engaging over only end portions of flexible facsimile stencil elements arranged in edge-to-edge succession around the surface of said second drum, there being abutment means on the surface of said second drum for locating each of said facsimile stencil element in alignment with a said master card element on said first drum, said shaft and drums being removable from said standards for insertion as a unit into a facsimile producing machine.

5. A loading support for a work holding unit of a facsimile producing machine, said unit having a shaft with a plurality of axially spaced work holding drums fixed thereon, said support comprising relatively fixed standards spaced apart and providing drop-in receptacles for the opposite end portions of the shaft of said unit, the walls of said receptacles maintaining said shaft against any appreciable axial and lateral movement, a pair of rollers associated with each said receptacle for rotatably supporting said shaft, a first one of the drums of said unit having means thereon for removably maintaining flexible master card elements in edge-to-edge relation on the drum surface substantially all around the axis of said unit shaft, and a second one of the drums of said unit having means thereon for engaging over only end portions of facsimile stencil elements arranged in edge-to-edge relation on the drum surface substantially all around the axis of said unit shaft, there being coacting means on said unit shaft and one of said standards for yieldingly maintaining said unit drums in successively advanced positions of rotation about the axis of said unit shaft, and abutment means on said first and second drums for precisely locating each facsimile stencil element on said second drum in alignment with a said master card element on said first drum.

6. A loading support as defined in claim 5 wherein said first drum of said unit has a sheet of transparent flexible material secured at one of its ends to said first drum and drawn tightly over and around all of said master card elements on said first drum, and means on the latter said drum for releasably securing the free end of said transparent sheet in its said tightly drawn condition for maintaining said master card elements on the drum in visible condition.

7. A loading support as defined in claim 5 wherein said first drum of said unit has a sheet of transparent flexible material secured at one of its ends to said first drum, and said support has a pivoted roller supported thereon and movable toward and from said first drum, said roller when moved toward said first drum being in position to engage said transparent sheet and lay it relatively tightly over inserted master card elements in succession in response to rotative advances of said drum.

References Cited in the file of this patent

UNITED STATES PATENTS

| | | |
|---|---|---|
| 2,529,978 | Thompson | Nov. 14, 1950 |
| 2,824,905 | Farber | Feb. 25, 1958 |